(12) United States Patent
Guthridge et al.

(10) Patent No.: US 7,124,131 B2
(45) Date of Patent: Oct. 17, 2006

(54) DISCIPLINE FOR LOCK REASSERTION IN A DISTRIBUTED FILE SYSTEM

(75) Inventors: D. Scott Guthridge, Portland, OR (US); Rajagopal Ananthanarayanan, Milpitas, CA (US); Ralph A. Becker-Szendy, Los Gatos, CA (US); Robert M. Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 10/427,035

(22) Filed: Apr. 29, 2003

(65) Prior Publication Data

US 2004/0220931 A1  Nov. 4, 2004

(51) Int. Cl.
*G06F 7/00* (2006.01)
*G06F 12/00* (2006.01)
*G06F 15/16* (2006.01)

(52) U.S. Cl. ............... 707/8; 707/201; 709/203
(58) Field of Classification Search ............ 707/1–203; 709/200–250
See application file for complete search history.

(56) References Cited

U.S. PATENT DOCUMENTS

| | | | | |
|---|---|---|---|---|
| 5,212,788 A | * | 5/1993 | Lomet et al. ............... | 707/201 |
| 5,414,839 A | * | 5/1995 | Joshi ............................ | 707/8 |
| 6,324,581 B1 | * | 11/2001 | Xu et al. ..................... | 707/10 |
| 6,353,898 B1 | * | 3/2002 | Wipfel et al. ................ | 714/48 |
| 6,601,070 B1 | * | 7/2003 | Zhang et al. ................. | 707/8 |
| 6,609,136 B1 | * | 8/2003 | Bamford et al. ............ | 707/202 |
| 6,772,155 B1 | * | 8/2004 | Stegelmann .................. | 707/8 |
| 6,775,703 B1 | * | 8/2004 | Burns et al. ................ | 709/228 |
| 6,850,938 B1 | * | 2/2005 | Sadjadi ........................ | 707/8 |
| 6,959,337 B1 | * | 10/2005 | McLaughlin et al. ........ | 707/8 |
| 7,003,531 B1 | * | 2/2006 | Holenstein et al. ......... | 707/201 |
| 7,065,540 B1 | * | 6/2006 | Chandrasekaran et al. .. | 707/203 |
| 2002/0147719 A1 | * | 10/2002 | Zhang et al. ................. | 707/9 |
| 2002/0165929 A1 | * | 11/2002 | McLaughlin et al. ....... | 709/213 |

* cited by examiner

*Primary Examiner*—Sam Rimell
*Assistant Examiner*—Rezwanul Mahmood
(74) *Attorney, Agent, or Firm*—Lieberman & Brandsdorfer, LLC

(57) ABSTRACT

A method and system for asserting a lock in a distributed file system is provided. All distributed locks have a lease for a limited time period, wherein the lease may be renewed periodically. A lock manager data structure is provided to maintain mode compatibility of locks granted to different client nodes for the same object. The process of acquiring or reasserting a lock includes determining whether there are other valid locks in use, as well as whether a valid lock is in operation in a conflicting or compatible mode with a requested lock. A new lock lease may be granted and a lock lease which has expired may be reasserted if a conflicting lease is not present.

19 Claims, 11 Drawing Sheets

2

DISCIPLINE FOR LOCK REASSERTION IN A DISTRIBUTED FILE SYSTEM

BACKGROUND OF THE INVENTION

1. Technical Field

This invention relates to a system and method for acquiring a distributed lock or reasserting a lock upon which a lock lease has expired. More specifically, the invention relates to respecting lock mode compatibility in a lock acquisition.

2. Description of the Prior Art

A storage area network ("SAN") is an increasingly popular storage technology. FIG. 1 is a prior art diagram 10 illustrating a SAN 5 with multiple server nodes 12 and 14, and multiple client nodes 16, 18, and 20. The SAN has metadata space 25 reserved for the server nodes 12 and 14. Each of the client nodes may access an object or multiple objects stored on the file data space 27 of the SAN, but may not access the metadata space. In opening the contents of an existing file object on the storage media in the SAN 5, a client contacts the server node to obtain metadata and locks. Metadata supplies the client with information about a file, such as its attributes and location on storage devices. Locks supply the client with privileges it needs to open a file and read or write data. The server node performs a look-up of metadata information for the requested file within the metadata space 25 of the SAN 5. The server node communicates granted lock information and file metadata to the requesting client node, including the location of all data blocks making up the file. Once the client node holds a distributed lock and knows the data block location(s), the client node can access the data for the file directly from a shared storage device attached to the SAN 5. Accordingly, one advantage of a SAN is that it allows multiple computers to access storage devices, also known as storage media.

In distributed system with shared persistent storage, such as the configuration shown in FIG. 1, modifications to file metadata are coordinated between a client node and a server node using distributed locking techniques. However, problems arise when a client node holding a lock stops communicating with other nodes or when the server node is subject to a failure. The communication failure may be due to the client node experiencing a failure, or a network failure causing the client node holding the lock to be subject to a network partition. For either the failure of the server node or a termination of communication with the client node, problems arise through a loss of any modifications to a file subject to the lock or to the file's metadata. In addition, access to the file subject to the lock may not be possible because of an inability to recover a lock from the node that owns the lock.

Prior art solutions for addressing failure associated with a distributed lock include leased based locks, versioned locks, lock expiration, and lock reassertion techniques. However, these prior art techniques do not always allow a client node to reassert a lock it previously held while maintaining cache consistency. In addition, the prior art techniques do not always deny a client node from reasserting a lock it previously held. Accordingly, there is a need for technique that enables client nodes to reassert a distributed lock while maintaining cache consistency.

SUMMARY OF THE INVENTION

This invention comprises a method and system for asserting a distributed lock while maintaining cache coherency in lock mode compatibility.

In a first aspect, a method for reasserting a lock in a distributed file system is provided. A lock manager data structure is created in volatile memory for each object on which a distributed lock is obtained from a server node. Increment of the lock version number for the distributed lock in persistent storage is managed. The lock version number increment is either deferred until lock information is evicted from the volatile memory, or incremented in persistent storage prior to grant of a first lock subsequent to a server start. In addition, cache consistency between a client node and the server node is preferably restored upon reassert of a lock request following loss of a lock lease.

In a second aspect of the invention, a computer system with a lock manager data structure for a system object assigned a distributed lock is provided. The data structure is in volatile memory. A manager adapted to control increment of a lock version number in persistent storage for the distributed lock is provided. The manager either defers increment of the lock version number in persistent storage until lock information is evicted from the volatile memory, or increments the lock version number in persistent storage prior to grant of a first lock subsequent to a server start. A cache manager is preferably provided to restore cache consistency between a client node and the server node in conjunction with a reassert of a lock request from the client node subsequent to loss of a lock lease.

In a third aspect of the invention, an article in a computer-readable signal-bearing medium is provided. Means in the medium are provided to create a lock manager data structure in volatile memory for each system object on which a distributed lock is obtained from a server node. In addition, means in the medium for managing increment of a lock version number for the distributed lock in persistent storage are provided. The managing means may either defer increment of the lock version number until lock information is evicted from the volatile memory, or increment the lock version number in persistent storage prior to granting a first lock subsequent to start of the server node. In addition, means in the medium may be provided to restore cache consistency between a client node and the server node in conjunction with a reassert of a lock request from the client node subsequent to loss of a lock lease.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a distributed file system, locks are requested by client nodes and granted by a server node. All locks have a lock version number that is provided to the client node together with the grant of the lock. In addition, a server node instance is identified by a persistently stored epoch number, wherein the epoch number is incremented each time the server node begins managing the storage containing the data to be locked, such as when the server node is restarted. When a client node is granted a lock from the server node, the client node establishes a lease with each server node serving a file system in use by the client node. A unique client node identifier is assigned to the client node when the lease is established. A granted lock is valid as long as a client node maintains a lease from the data server node that has granted the lock. If a client node fails to renew a lease for a granted lock, the lease will expire. The client node must obtain a new lease with a new client node identifier if they need the lock. If a client node should request a lock that is indicated as owned by a second client node in the system, but the second client node has failed to maintain the lock lease, the requesting client node may recover the lock from the second client node. This lock is known as a stolen lock. When a lock is stolen, the server node increments the lock version number on disk. Alternatively, if a lock lease has expired and has not been stolen, then a client node may try to reassert the lock. Accordingly, locks may be acquired or reasserted within various parameters while maintaining compatibility within the modes of the granted locks.

Technical Details

In a client node, a filesystem is provided, wherein the file system is in the form of a subtree rooted at a particular directory. The root of the tree is the name of the file system that describes the filesystem tree rooted at the root directory. A distributed lock is obtained by a client node from a server node serving the filesystem which contains the file system object metadata. Such locks may include session locks, data locks, and range locks. Each of these types of locks operate in different modes. For example, there are eight different modes of operation for a session lock. Some of these modes are compatible, meaning they may co-exist, and others are not. Accordingly, in the process of acquiring or reasserting a lock it is important to determine whether there are other valid locks in progress, as well as whether a valid lock is operating in a conflicting or compatible mode with a requested lock.

Figure 1:
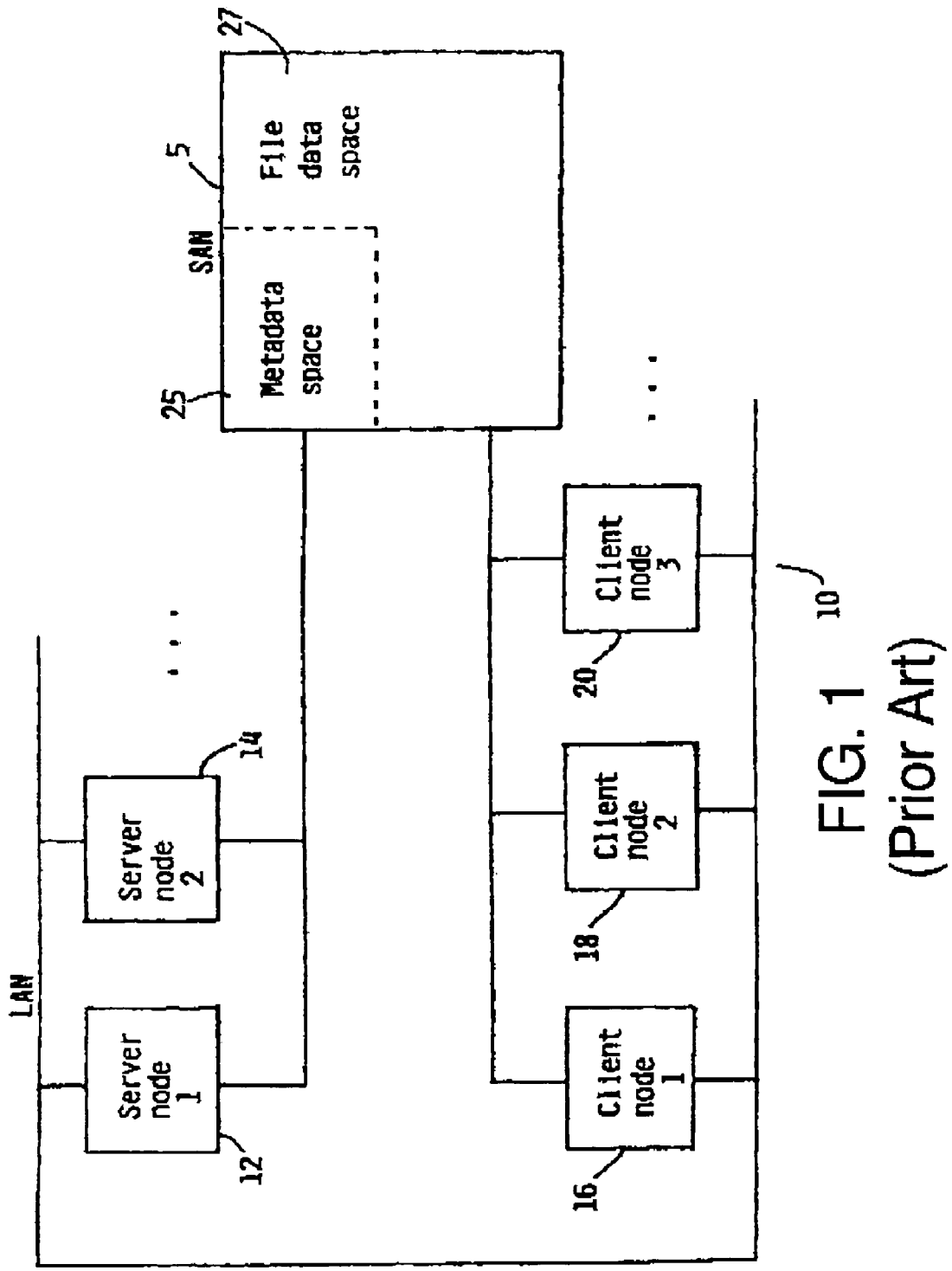
FIG. 1 is a prior art block diagram of a computer system with multiple client nodes and a server node in communication with a storage area network.
Figure 2:
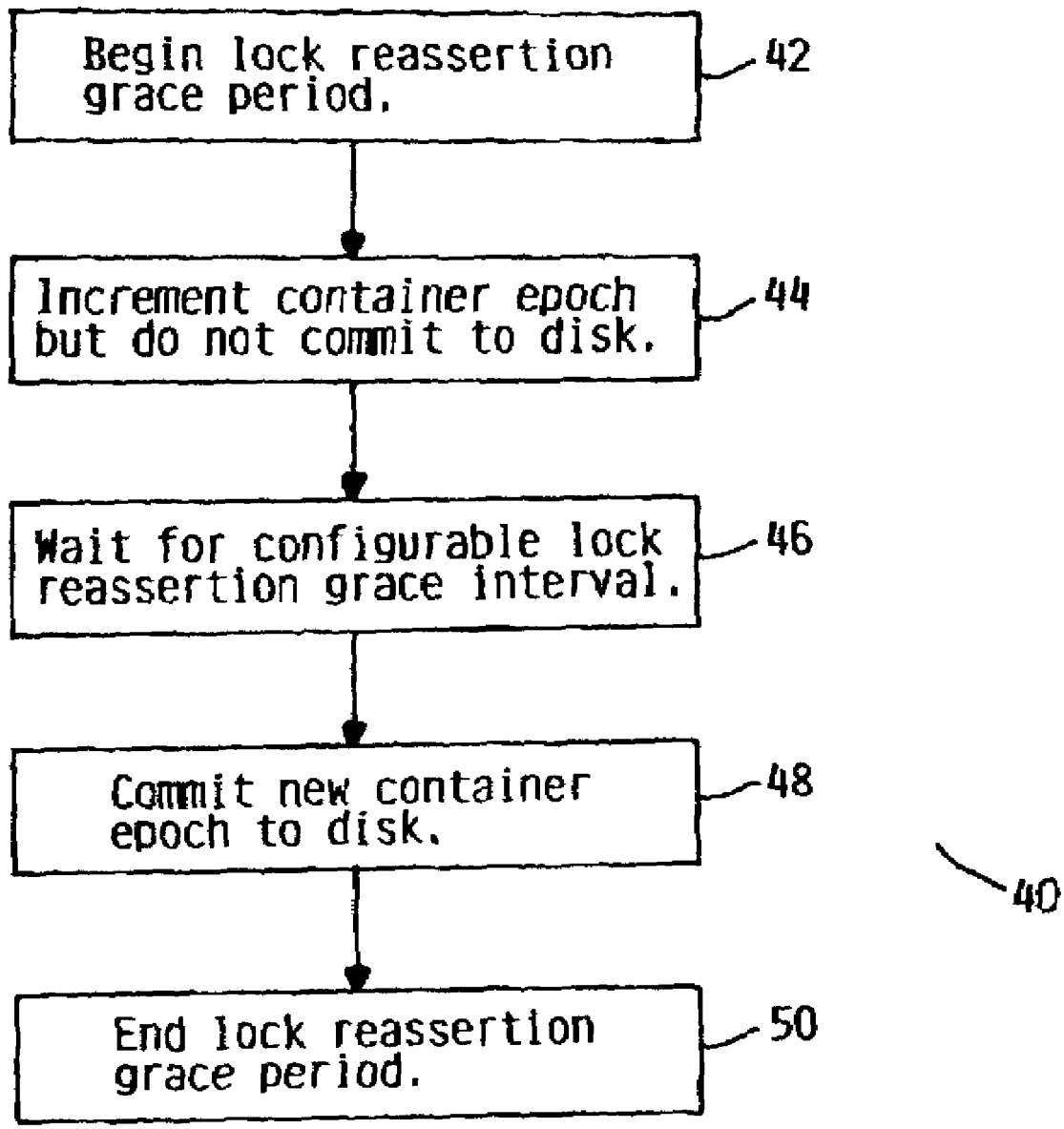
FIG. 2 is a flow chart illustrating the routine for opening a file system according to the preferred embodiment of this invention, and is suggested for printing on the first page of the issued patent.
Figure 4A:
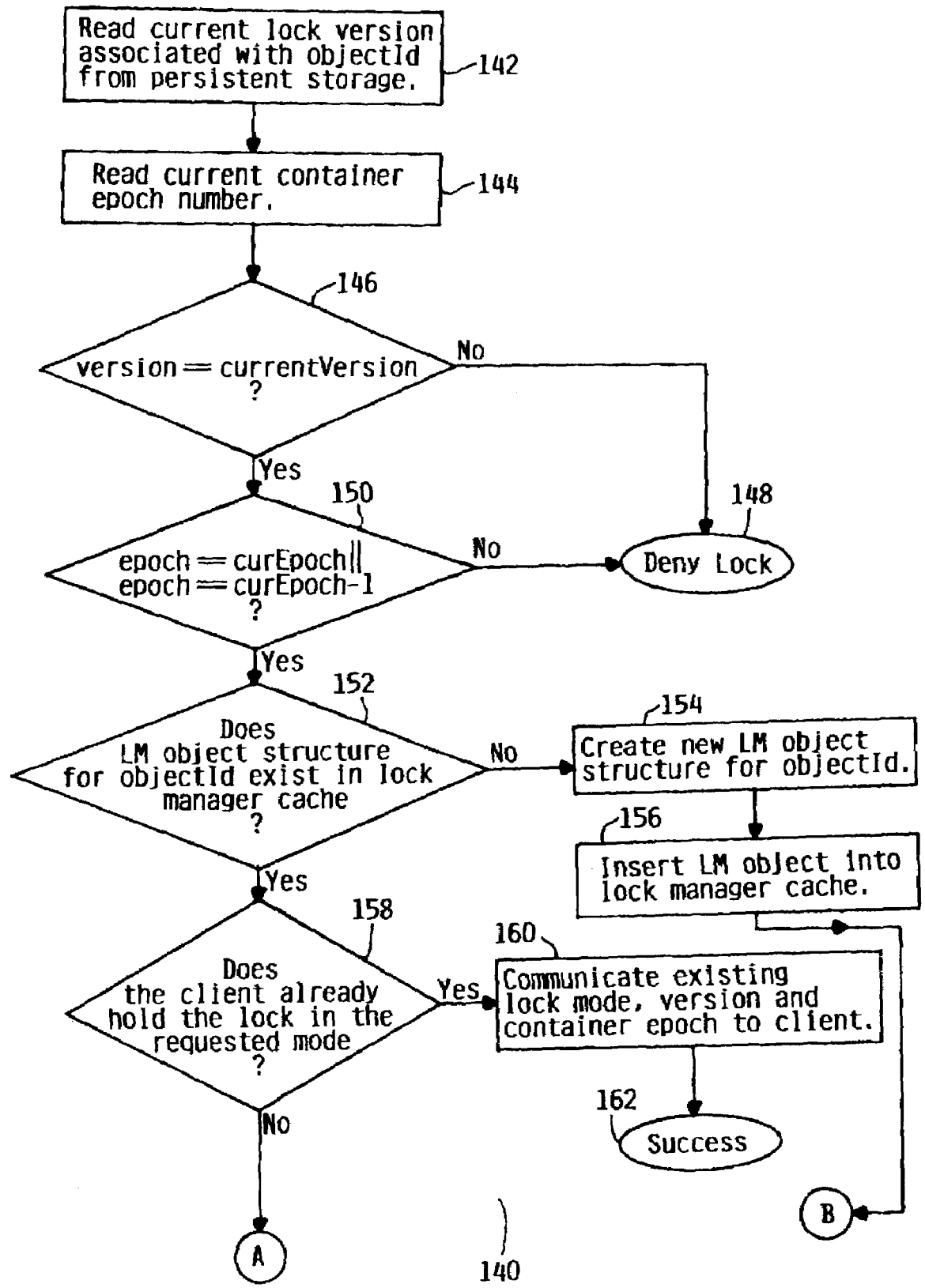
FIG. 4 is a flow chart illustrating the routine for reasserting a lock.
Figure 4B:
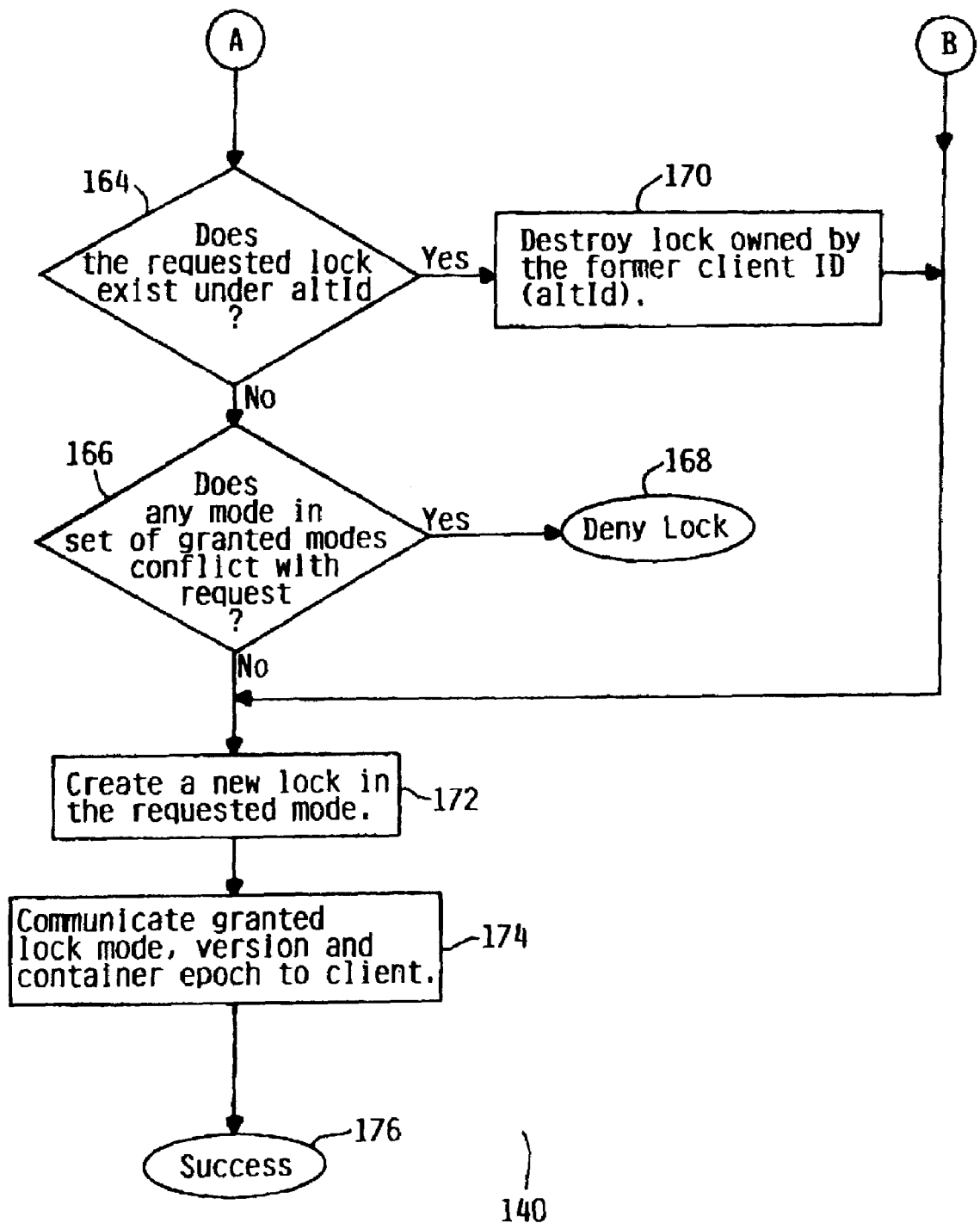

When a server node is in a start-up mode of operation, it is assigned a file system to manage. For each file system that the server node is assigned, it must proceed through a routine to open the file system. FIG. 2 is a flow chart 40 illustrating the process of a server node opening a system. In the initial state of opening the file system, a lock reassertion grace period is initiated 42. This allows client nodes in the system to reassert old locks for a given amount of time, without accepting new lock requests from client nodes in the system. During the lock reassertion grace period, the file system epoch number is incremented in memory 44, but the increment is not committed to disk. The server node then waits for a configurable lock reassertion grace interval 46, prior to committing the new file system epoch number to disk 48. Once the new file system number is committed to disk, the lock reassertion grace period ends 50, and the server node will accept new lock requests. During this grace period a client may reassert a lock in which a lease has expired. A lock reassertion routine is shown in FIG. 4. Accordingly, the process of opening a file system includes a lock reassertion grace period to allow client nodes holding locks to reassert those locks.

Figure 3A:
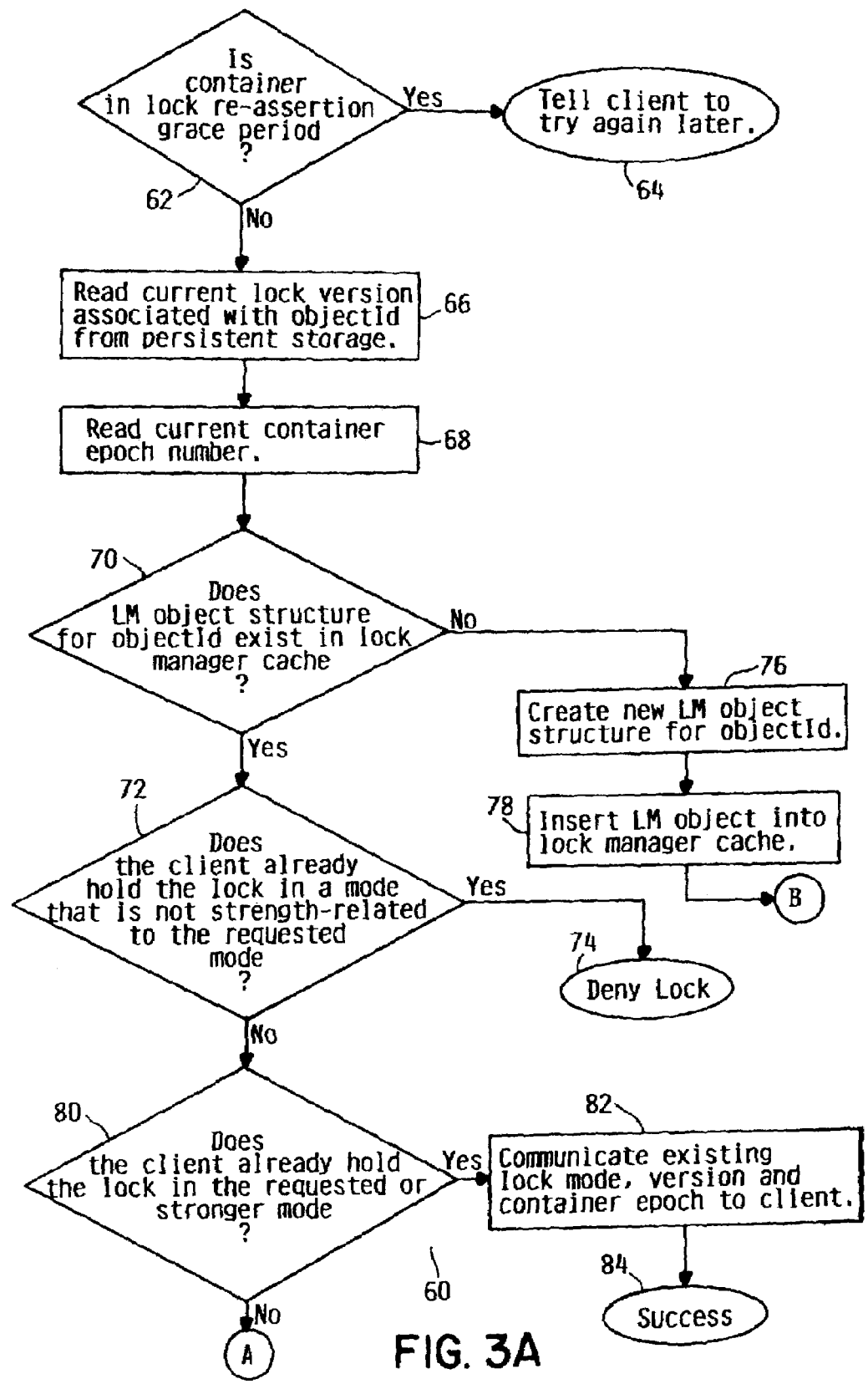
FIG. 3 is a flow chart illustrating the routine for acquiring a lock.
Figure 3B:
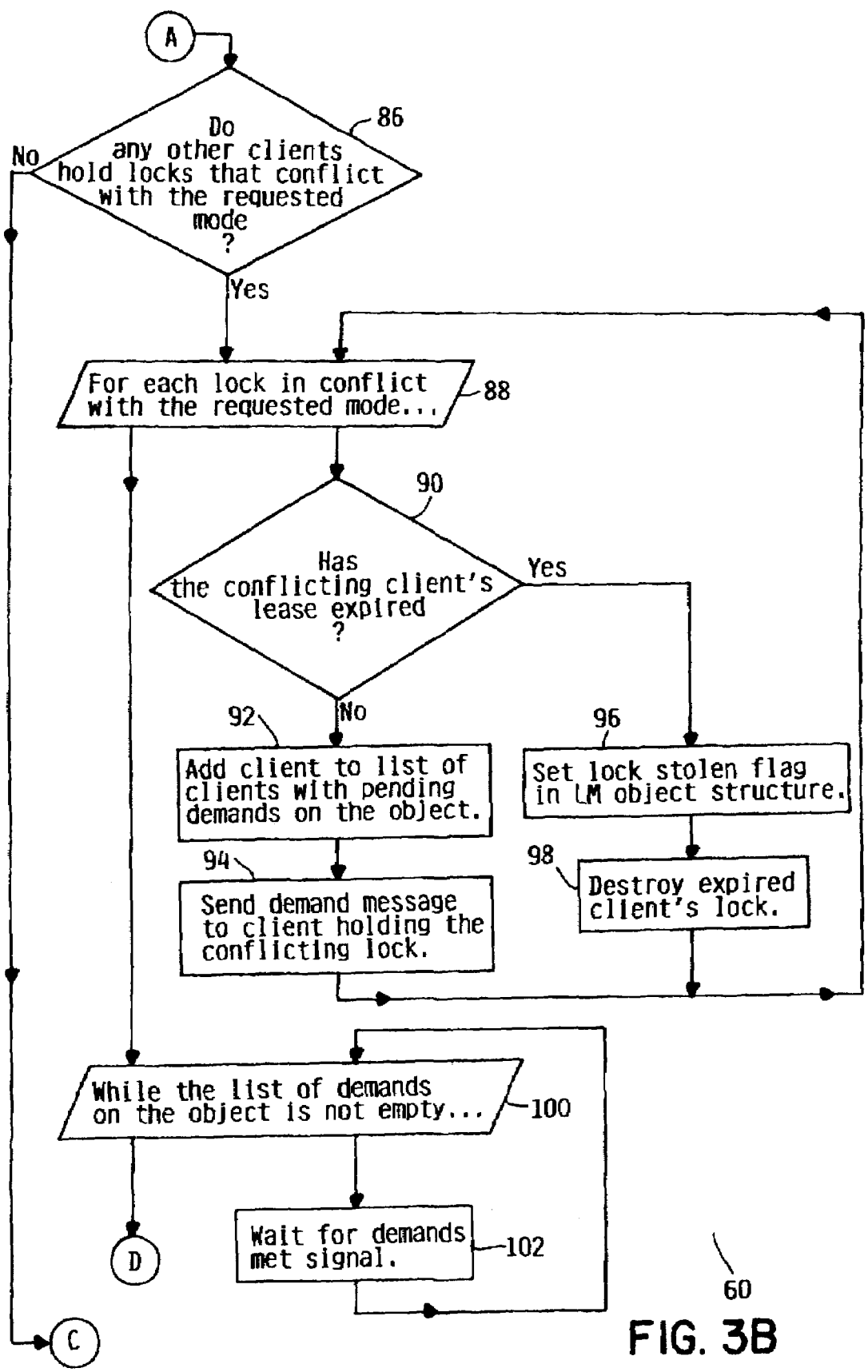
Figure 3C:
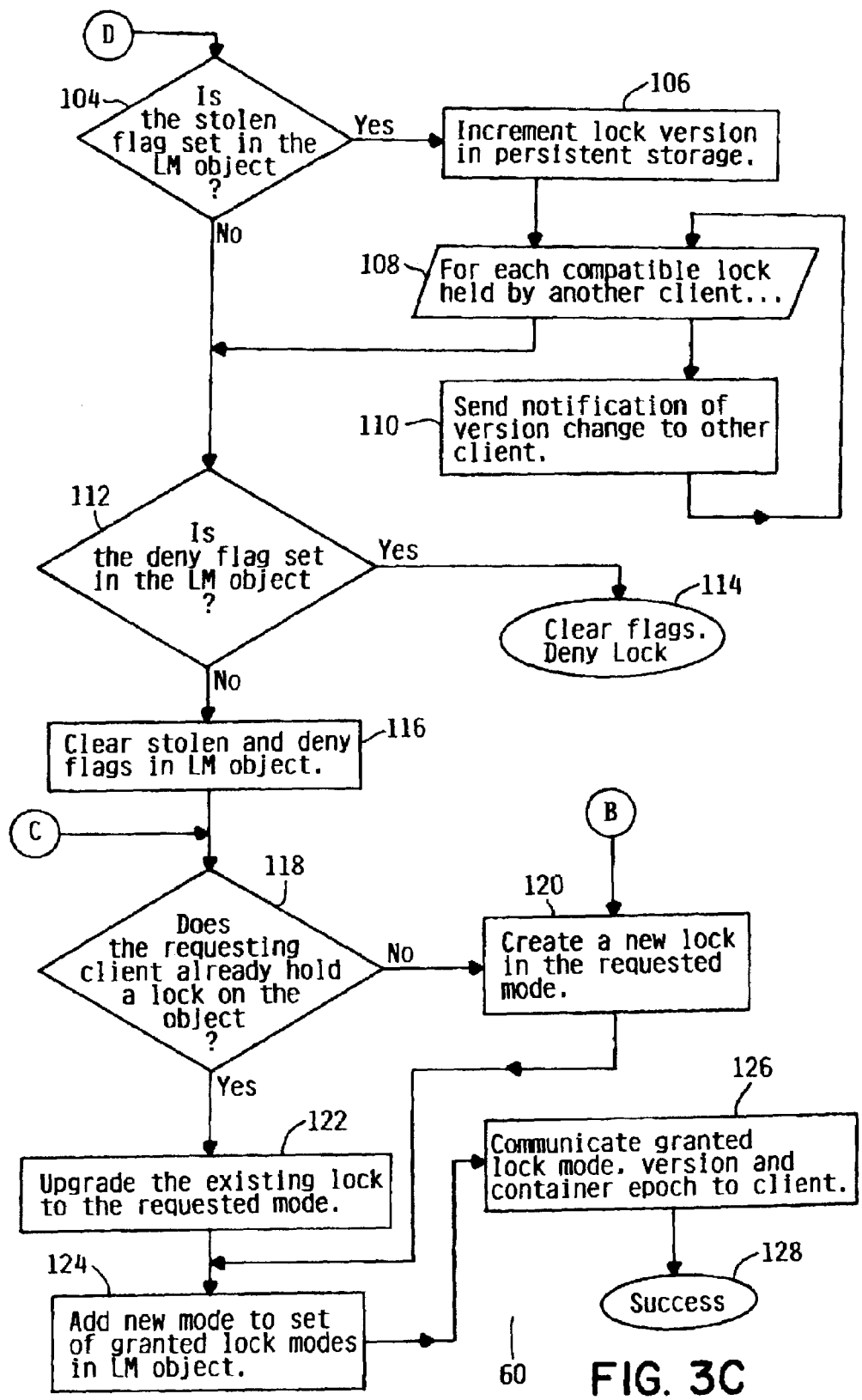

Following the process of opening a file system, a new lock may be requested by a client from the server node managing the file system. FIG. 3 is a flow chart 60 illustrating the process of a client acquiring a new lock from the server node. The first step in acquiring a new lock is to determine if the file system as specified by the client is involved in a lock reassertion grace period 62. If the response to the query at step 62 is positive, the server node will deny the lock request to the client 64 as new lock requests are denied during a lock reassertion grace period. However, if the response to the query at step is negative the current lock version number associated with the request object identifier is read from persistent storage on the server node 66. Thereafter, the current file system epoch number is read from the server node 68. For each object in the filesystem on which a client obtains a lock, the server node creates an in-memory data structure, hereinafter referred to as the lock manager object structure. Following the step of reading the epoch number for the current file system, a query is conducted to determine if the lock manager data structure for the identified object exists in the lock manager cache on the server node's volatile memory 70. If the lock data structure does not exist, a new lock manager data structure for the identified object is created 76 and inserted into the lock manager cache in the server node 78. Following creation of the new lock manager object data structure, a new lock in the requested mode is created 120, and the requested lock mode is added to a set of granted lock modes in the lock manager data structure 124. The lock mode is then communicated to the client requesting the lock, together with the lock version, and the file system epoch number 126 indicating successful completion of acquisition of a new lock 128. Accordingly, the steps discussed herein focus on granting a lock request to a client in which a lock manager data structure for the object identified by the client is not in the cache.

If at step 70 it is determined that the lock manager data structure is in the cache in the server node's volatile memory, a query is conducted to determine if the client requesting the lock already holds a lock in a mode that is not strength related to the requested lock mode 72. A positive response to the query at step 72, results in a denial of the lock request 74. However, a negative response to the query at step 72, results in a subsequent query to determine if the client requesting the lock is in possession of another lock that has a mode equivalent or greater than the mode in the requested lock 80. A positive response to the query at step 80 will return a communication from the server node to the client with the lock version number and the file system epoch number of the lock it holds 82, and a successful completion of the lock acquisition process 84. However, a negative response will result in a subsequent query to determine if any other client nodes in communication with the server node are in possession of a lock that conflicts with the mode presented by the client in the lock request 86. If it is determined that other client nodes in communication with the server node are not in possession of a lock with a conflicting mode, it must be determined whether the client node requesting the lock is already in possession of a lock for the identified object 118. For example, the client node requesting the lock may be in possession of a read lock for the identified object and is now in the process of acquiring a write lock. A positive response to the query at step 118 will result in an upgrade in the existing lock to the mode in the current lock request 122. Alternatively, a negative response to the query at step 118 will result in creation of a new lock in the requested mode 120 as the client node is not in possession of a lock. Thereafter, an entry for the lock mode associated with new lock 120 or the modified pre-existing lock 122 is added to the lock manager data structure 124. The lock mode is then communicated to the client node requesting the lock, together with the lock version, and the file system epoch number 126 indicating successful completion of acquisition of the new lock 128. Accordingly, the steps presented above outline the process of granting a lock to a client node when the mode of the requested lock mode does not conflict with any current locks and associated modes held by other client nodes in the system.

Figure 5:
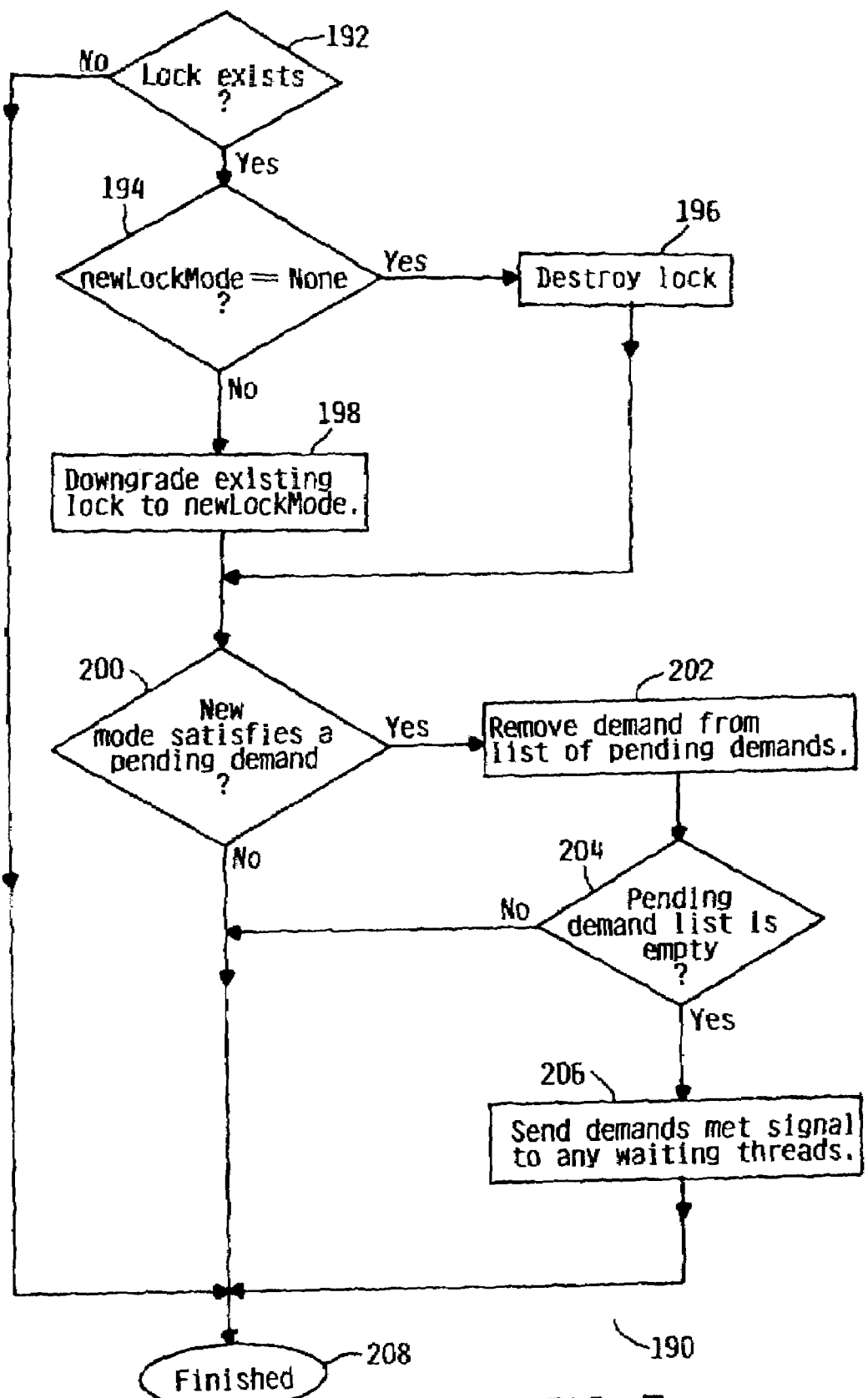
FIG. 5 is a flow chart illustrating the routine for downgrading a lock.

The steps described above illustrate the process of granting a lock to a client node when other client nodes in the system do not hold locks that are in a conflicting mode to the lock in the process of being requested. However, if at step 86, the response to the query is positive, the conflicting lock mode must be resolved. For each lock in conflict with the requested lock mode 88, a query is conducted to determine if the existing client node's lock lease that conflicts with the current lock request has expired 90. If the response at step 90 is positive, a process for theft of the lease expired lock is initiated. A flag is set in the lock manager data structure to indicate that the lock has been stolen 96 and the expired client node's lock is then deleted 98. However, if the response at step 90 is negative, the client node requesting the lock is added to a list of client nodes that may hold locks with modes that conflict with the mode of the lock being requested 92. A demand message is then sent to the client node in possession of the conflicting lock 94. The processes outlined in steps 92–98 are conducted for each existing lock in conflict with the mode of the requested lock. For each client node that has received a demand message 100, the server node waits for the client node to acknowledge receipt of the demand message in the form of a signal 102. Such a signal may be a message requesting to downgrade the mode of the existing lock, as illustrated in FIG. 5, or a message denying the demand. Following a response to the demand from the client node holding the lock, a query is conducted to determine if the flag is set in the lock manager data structure to indicate that the lock has been stolen 104. If the stolen lock flag is set in the lock manager data structure, the lock version number is incremented in persistent storage of the server node 106. For each compatible lock held by another client node 108, a notification of the increment of the lock version is then sent to each client node identified at step 110. Some client nodes in the system holding a lock may not have received a demand message if this lock mode was not determined to be a conflicting lock mode. Therefore, the process of notification is conducted to give the correct lock version to all client nodes in the system holding a lock in case any of the client nodes need to reassert the lock at a later time. If the response to the query at step 104 is negative, a subsequent query is conducted to determine if a deny flag was set in the lock manager data structure 112 by a client node holding a lock. A deny flag set by at least one client node will result in denial of the lock by the server node 114. Alternatively, if a deny flag was not set and the stolen flag was not set, a clean up of the lock manager data structure is conducted 116 to clear stolen and deny flags that may be in the lock manager data structure for the identified object. Thereafter, the routine of acquiring a lock either creates a new lock 120 or upgrades an existing lock in the requested mode 122, and proceeds with completing the granting of the lock, as shown in steps 124, 126, and 128. Accordingly, the process of acquiring a lock ensures that there is not a conflict with an existing lock that may hold a lock in a conflicting mode, as well as notifies client nodes holding locks with non-conflicting modes of a change in the lock version number.

In addition to acquiring a lock, or requesting an upgrade to an existing lock, a client node may also reassert a lock for a lease that has expired. FIG. 4 is a flow chart 140 illustrating the routine for reasserting a lock on an expired lock lease. The current lock version number associated with the identified object is read from persistent storage of the server node 142. Thereafter, the current file system epoch number is read 144. A query is then conducted to determine if the lock version number as provided by the client node is equivalent to the lock version number read from persistent storage 146. If the response to the query at step 146 is negative, the lock reassertion is denied at the lock version number has changed and the client node can no longer reassert the lock 148. However, if the response to the query at step 146 is positive, a subsequent query is conducted to determine if the epoch number of the file system as provided by the client node is equivalent to the epoch number of the file system or if the epoch number of the file system as provided by the client node is equivalent to the previous epoch number of the file system 150. A negative response to the query at step 150 will result in a denial of the lock reassertion 148. Alternatively, a positive response to the query at step 150 will enable the routine to continue for reassertion of the lock. Accordingly, the first part of the lock reassertion routine is to determine if the client node has the current lock version number and is within an appropriate range for the epoch number of the file system in which the identified object is located.

Following a positive response to the query a step 150, a subsequent query is conducted to determine if a lock manager data structure for the client node identified object exists in the lock manager cache 152. A negative response to the query at step 152 will result in creation of a new lock manager data structure for the identified object 154, followed by insertion of the lock manager data structure object into the lock manager cache 156. However, if at step 152, the response to the query is negative, a subsequent query is conducted to determine if the reasserting client node is currently in possession of a lock in the requested mode 158. If the requesting client node is already in possession of the lock in the requested mode, the existing lock mode, lock version and file system epoch number is communicated to the client node 160, and the lock is successfully reasserted 162. However, if the response to the query at step 158 is negative, another query is conducted to determine if the requested lock exists under an alternative identifier 164. Every time a client obtains a new lease, a client node is assigned a client node identifier associated with the lease. An alternative client node identifier is a client node identifier associated with the now expired lease that was in effect at the time the lock was granted. A positive response to the query at step 164 will result in deletion of the lock owned by the alternative identifier 170. Alternatively, a negative response to the query at step 164 will result in a subsequent query to determine if any lock mode in the set of existing locks conflicts with the lock reassertion request 166. If there is a conflict, the lock reassertion request is denied 166.

However, if there is no lock mode conflict, a new lock is created in the requested lock mode 172. Similarly, following insertion of the lock manager data structure object into the lock manager cache at step 156, or deletion of the lock owned by an alternative identifier at step 170, a new lock is created in the requested lock mode 172. Following the creation of the new lock 172, the lock mode, the lock version, and the file system epoch number is communication to the client node reasserting the lock 174, and the lock is granted to the client node 176. Accordingly, the lock reassertion routine enables a client node to reassert a lock request for a lease that has expired within certain parameters.

Part of the lock reassertion subroutine not clearly shown in FIG. 4 pertains to merging of client and server node attributes. Some attributes of a file, such as the logical end of the file, modify time, owner, group, mode, etc., are maintained in the client node's data cache when a file is in the process of being modified. Other attributes, such as a file link count and block allocation are maintained by the server node. When a client node is in the process of reassertion a lock subsequent to a failure where either the client node maintained data or the server node maintained data attributes may be lost, the latest client node maintained attributes may be merged with the latest server node maintained attributes. The process of merging the client node and server node maintained attributes restores cache consistency between the client node and server node.

A client node in need of a lock may either request a new lock or reassert a lock on an expired lock lease. During the routine of acquiring a lock, as shown in FIG. 3, a lock requesting client node may send a demand to another client node holding a lock in a conflicting mode to request a downgrade of the lock mode if the client node holding the lock is no longer in need of the lock in the granted mode. FIG. 5 is a flow chart 190 illustrating the routine of downgrading a lock mode on an existing lock. This routine is initiated with a query to determine of the lock in the mode in question exists 192. If the response to this query is negative, the routine is complete 208 as the client node holding the lock may have already downgraded the lock mode. However, if the lock in the mode in question does exist, a subsequent query is conducted to determine if the mode to which the lock is to be downgraded is 'None' indicating that the lock should be released completely 194. If the response to the query at step 194 is negative, the mode of operation of the existing lock is downgraded 198. Alternatively, if the response to the query at step 194 is positive, the existing lock is deleted 196. Following steps 196 or 198, a subsequent query is conducted to determine if the mode of the lock being acquired satisfies a pending demand 200. A negative response to the query at step 200, will result in completion of the lock downgrade 208. However, a positive response to the query at step 200 will result in removal of the demand from the list of pending demands 202. An inquiry is then conducted to determine of the pending demand list is empty 204. If the list is empty, a signal is sent to any waiting threads indicating that the demand to downgrade the lock mode has been met 206. Following the signal at step 206 or a negative response to the inquiry at step 204, the downgrade of the lock mode will have been completed. Accordingly, the lock mode for an existing lock may be downgraded either in response to a demand by a client node acquiring a lock or in an unsolicited fashion.

Figure 6:
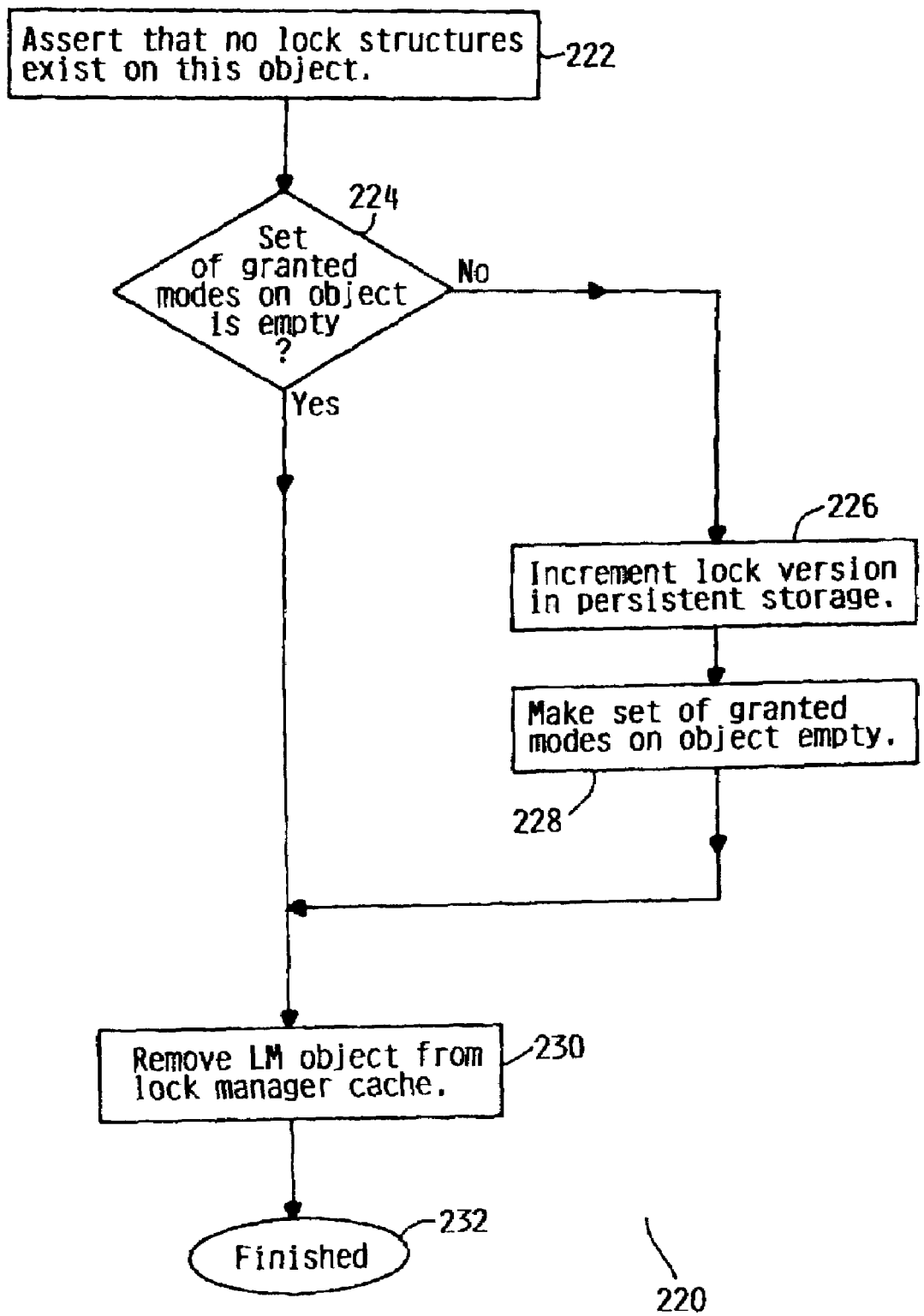
FIG. 6 is a flow chart illustrating the routine for evicting an object from cache.

During the routine of downgrading a lock mode for an existing lock, it is possible that the lock mode has been previously downgraded, as shown at step 192 of FIG. 5. In this situation, the lock is occupying space in memory without providing any use, and the lock manager data structure needs to be cleaned. A lock eviction routine may be called by a background manager to evict the downgraded lock from cache memory. FIG. 6 is a flow chart 220 illustrating the process of evicting the downgraded lock. The first step in the process is to assert that there were locks in the lock manager data structure, but the modes associated with the locks have now been downgraded 222. A query is then conducted to determine if a set of modes granted on the identified object is empty 224. If the response to the query at step 224 is positive, the lock manager data structure is removed from the lock manager cache 230 and the eviction routine is completed 232. However, if the response to the query at step 224 is negative, the lock version number is incremented in persistent storage 226. A set of granted modes in the object is then made empty 228. Thereafter, the lock manager data structure is removed from the server node cache 230 and the eviction routine is complete 232. Accordingly, the eviction routine functions to clean up the lock manager data structure for locks in which the associated modes have been downgraded.

Figure 7:
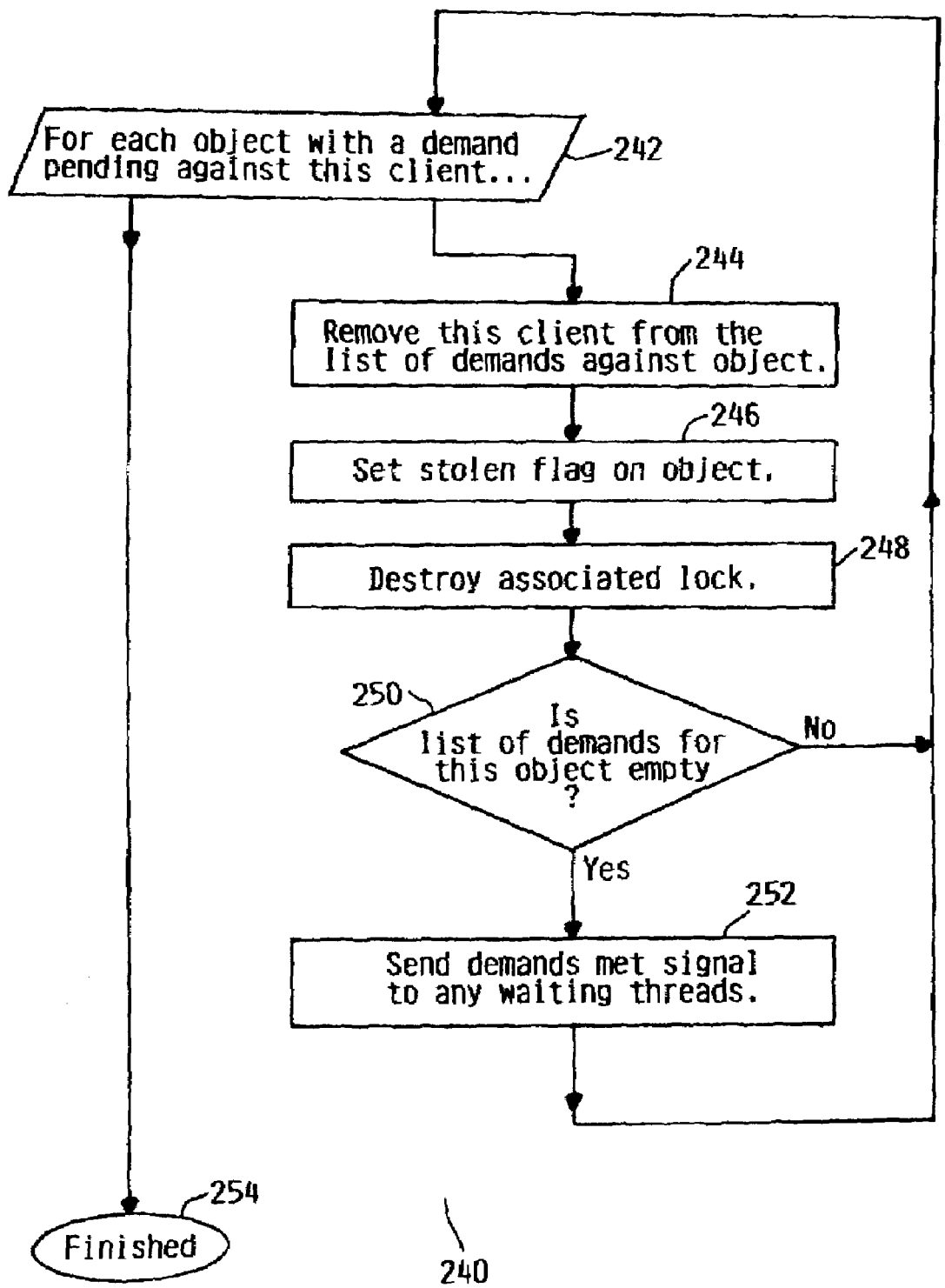
FIG. 7 is a flow chart illustrating the routine for explicit theft of an expired lock.

A client node granted a lock may hold the lock for a set lease period. Thereafter, the client node may renew the lease. However, if a client node fails to renew a lock lease, the lease will expire. FIG. 7 is a flow chart 240 illustrating the steps involved in an action taken on a lock lease that has expired. For each object that has a thread waiting for a response from a client node with an expired lease 242, the client node is removed from the list of demands against the object 244. The stolen flag is then set on the object 246, followed by deletion of the lock associated with the expired lease client node 248. A query is then conducted to determine if the list of demands for this object is empty 250. If the response to the query at step 250 is negative, the routine returns to step 242 to look at all demands on different objects in which the lock lease has expired. However, if the response to the query at step 250 is positive, this is an indication that the lock for the expired lease client node was the final demand or the client node was subject to a failure or network partition. A signal is sent to the server node to indicate that the demands have been met for all threads waiting to acquire the lock 252. The routine will return to step 242, where it is determined that all demands on different objects have been met and the routine is completed 254. Accordingly, when a lock lease for an identified object has expired and a thread acquiring the lock is waiting for a response from the client node holding the lock, the lock may be stolen for failure of the client node to renew the lease by modifying the lock mode and file information in memory.

Figure 8:
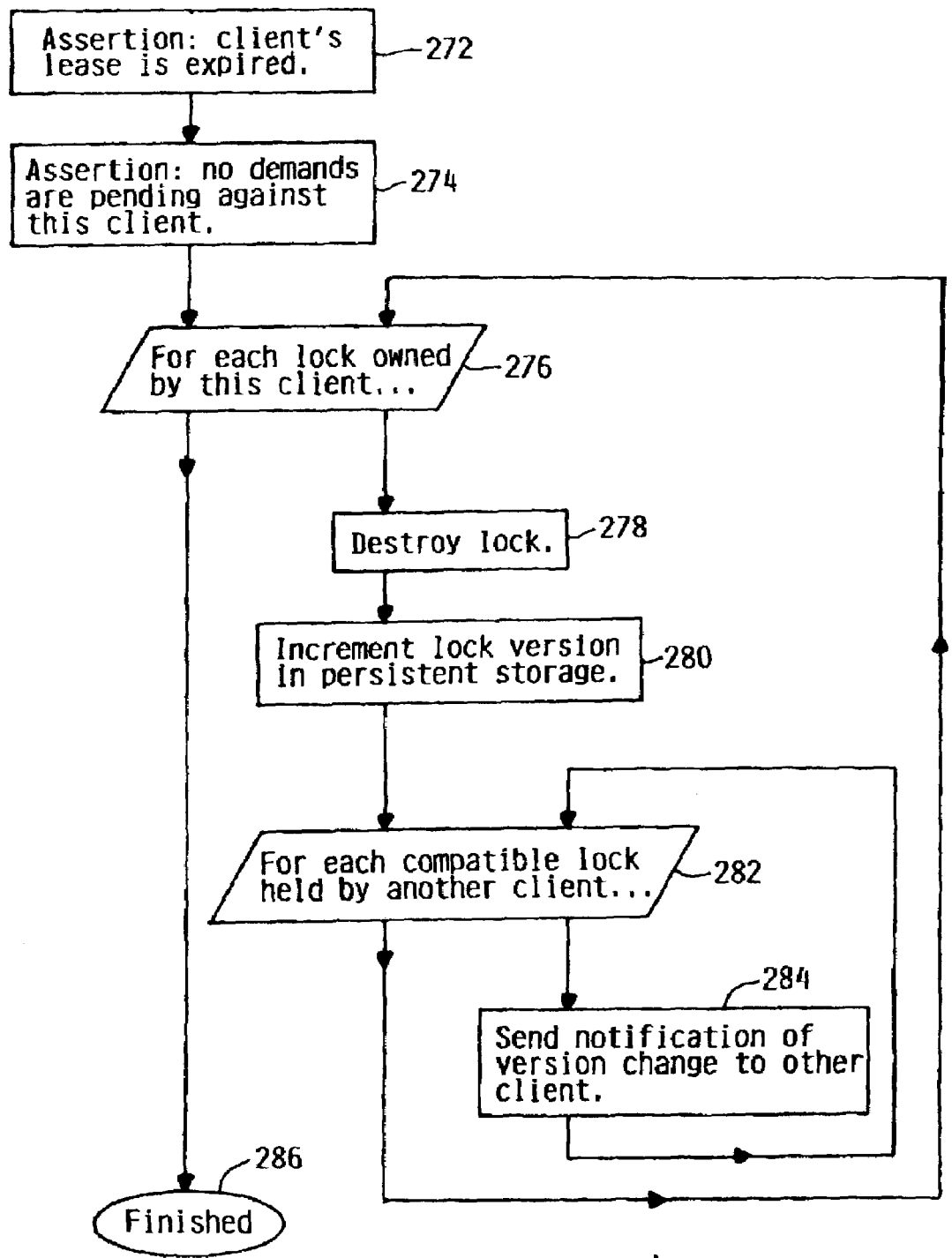
FIG. 8 is a flow chart illustrating the routine for implicit theft of an expired lock.

FIG. 7 is a routine that is called when a client node holding a lock has failed to renew the lease. The process involves an explicit theft of the lock from a thread waiting for the lock. However, if a lock lease has expired for an extended period of time, the lock may be implicitly stolen from the lock holder. FIG. 8 is a flow chart 270 illustrating a routine for discarding a lock that has been expired for an extended period of time. The first step requires an assertion that the client node's lease has expired 272. Thereafter, a subsequent assertion is conducted indicating that no demands are pending against this client node 274. For each lock owned by the client node 276, the lock is deleted 278. The lock version number is then incremented in persistent storage 280. For each compatible lock held by another client node 282, notification of the change in the lock version number is sent to those client nodes 284. Accordingly, the implicit theft enables the lock to be deleted following assertions of the lease expiration and the lack of demands pending against the client node.

Advantages over the Prior Art

The lock acquisition and lock reassertion routines described herein enable a client node to request a distributed lock while maintaining cache consistency. Increment of the lock version number in persistent storage number is either deferred until lock information is evicted from volatile memory, or incremented in persistent storage prior to granting a first lock following a start or restart of the server. Incrementing the lock version number in persistent storage before the grant of the first lock after a restart of the server removes any issues associated with the server storing the lock state in volatile memory. In addition, the process of restoring cache consistency between a client node and a server node upon reasserting a lock request subsequent to a loss of a lock lease enables both the client and the server to recover any data that may have become lost during a loss of a lock lease. When a filesystem epoch number is incremented, the commitment of the new epoch number to persistent storage is deferred until expiration of a lock reassertion grace period. This enables client's previously holding locks to reassert their locks for a defined time period. Once the filesystem epoch number is committed to persistent storage, the client that failed to reassert the lock within the grace period will lose its lock and it's ability to reassert it's lock.

Alternative Embodiments

It will be appreciated that, although specific embodiments of the invention have been described herein for purposes of illustration, various modifications may be made without departing from the spirit and scope of the invention. In particular, a list of granted lock modes may be maintained in volatile memory. An increment of the lock version number in persistent memory may be deferred until the lock information is evicted from the volatile memory. Finally, both the epoch and the lock version can be represented any incrementable value such as an alphabetic character or raw bytes—not necessarily only a number. Accordingly, the scope of protection of this invention is limited only by the following claims and their equivalents.

We claim:

1. A computer implemented method for reasserting a lock in a distributed file system comprising:
    creating a lock manager data structure in volatile memory for an object assigned a distributed lock; and
    assigning an identifying number to a file system in which said object is located, said file system identifying number adapted to be incremented upon a restart of a server assigned to said file system;
    comparing a file system identifying number provided by a client requesting a lock on said system object with a current file system identifying number in which said object is located; and
    granting a lock reassertion request to said requesting client subsequent to breaking a lock if said compared file system identifying numbers are within an appropriate range.

2. The method of claim 1, further comprising restoring cache consistency between a client node and a server node upon reasserting a lock request subsequent to loss of a lock lease.

3. The method of claim 2, wherein the step of restoring cache consistency between a client node and said server node includes merging client node data attributes with server node data attributes.

4. The method of claim 1, further comprising deferring commitment of a new filesystem identifying number in persistent storage until expiration of a lock reassertion grace period.

5. The method of claim 1, further comprising notifying a client of theft of a lock on which said client possesses a compatible lock.

6. The method of claim 1, wherein said data structure includes data selected from the group consisting of: a list of locks held by each client node, a lock mode for each lock, a state of any pending demands, and a set of lock modes granted on an object.

7. A data storage system comprising:
    a lock manager data structure for a system object assigned a distributed lock from a server, wherein said data structure is in volatile memory;
    an identifying number assigned to a file system in which said object is located, said file system identifying number adapted to be incremented upon a restart of said server assigned to said file system; and
    a manager adapted to compare a file system identifying number provided by a client requesting a lock on said system object with a current file system identifying number in which said object is located, and to grant a lock reassertion request to said requesting client subsequent to breaking a lock if said compared file system identifying numbers are within an appropriate range.

8. The system of claim 7, further comprising a cache manager adapted to restore cache consistency between said client node and said server in conjunction with a reassert of a lock request from said client subsequent to loss of a lock lease.

9. The system of claim 8, wherein said cache manager merges client attributes with server data attributes.

10. The system of claim 7, further comprising a filesystem manager adapted to defer commitment of a new filesystem identifying number in persistent storage until expiration of a lock reassertion grace period.

11. The system of claim 7, further comprising a lock theft manager adapted to notify said client node of theft of a lock on which said client possesses a compatible lock.

12. The system of claim 7, wherein said data structure includes data selected from the group consisting of: a list of locks held by each client node, a lock mode for each lock, a state of any pending demands, and a set of lock modes granted on an object.

13. An article comprising:
    a computer-readable signal-bearing medium;
    means in the medium for creating a lock manager data structure in volatile memory for an object assigned a distributed lock obtained from a server;
    means in the medium for assigning an identifying number to a file system in which said object is located;
    means in the medium for incrementing said file system identifying number upon a restart of said server assigned to said file system;
    means in the medium for comparing a file system identifying number provided by a client requesting a lock on said system object with a current file system identifying number in which said object is located; and
    means in the medium for granting a lock reassertion request to said requesting client subsequent to breaking a lock if said compared file system identifying numbers are within an appropriate range.

14. The article of claim 13, wherein the medium is selected from a group consisting of: a recordable data storage medium and a modulated carrier signal.

15. The article of claim 13, further comprising means in the medium for restoring cache consistency between a client and said server in conjunction with a reassert of a lock request from said client subsequent to loss of a lock lease.

16. The article of claim 15, wherein said means for restoring cache consistency includes a cache manager adapted to merge client attributes with server node attributes.

17. The article of claim 13, further comprising means in the medium for deferring commitment of a new filesystem identifying number in persistent storage until expiration of a lock reassertion grace period.

18. The article of claim 13, further comprising means in the medium for notifying a client of theft of a lock on which said client possesses a compatible lock.

19. The article of claim 13, wherein said data structure includes data selected from a group consisting of: a list of locks held by each client node, a lock mode for each lock, a state of any pending demands, and a set of lock modes granted on an object.

* * * * *